United States Patent
Hayakawa et al.

(10) Patent No.: US 10,078,452 B2
(45) Date of Patent: Sep. 18, 2018

(54) PERFORMANCE INFORMATION MANAGEMENT SYSTEM, MANAGEMENT COMPUTER, AND PERFORMANCE INFORMATION MANAGEMENT METHOD

(71) Applicant: HITACHI, LTD., Tokyo (JP)

(72) Inventors: Hiroshi Hayakawa, Tokyo (JP); Takaki Kuroda, Tokyo (JP)

(73) Assignee: HITACHI LTD., Tokyo (JP)

( * ) Notice: Subject to any disclaimer, the term of this patent is extended or adjusted under 35 U.S.C. 154(b) by 16 days.

(21) Appl. No.: 15/125,210

(22) PCT Filed: Jun. 12, 2014

(86) PCT No.: PCT/JP2014/065617
§ 371 (c)(1),
(2) Date: Sep. 12, 2016

(87) PCT Pub. No.: WO2015/189957
PCT Pub. Date: Dec. 17, 2015

(65) Prior Publication Data
US 2017/0139608 A1 May 18, 2017

(51) Int. Cl.
*G06F 3/06* (2006.01)

(52) U.S. Cl.
CPC ............ *G06F 3/0608* (2013.01); *G06F 3/067* (2013.01); *G06F 3/0631* (2013.01); *G06F 3/0653* (2013.01)

(58) Field of Classification Search
CPC .... G06F 3/0608; G06F 3/0631; G06F 3/0653; G06F 3/067
See application file for complete search history.

(56) References Cited

U.S. PATENT DOCUMENTS

| | | | |
|---|---|---|---|
| 5,784,703 A | * 7/1998 | Muraoka | G06F 3/0614 711/112 |
| 9,229,854 B1 | * 1/2016 | Kuzmin | G06F 12/0246 |
| 2007/0260842 A1 | 11/2007 | Faibish et al. | |

(Continued)

FOREIGN PATENT DOCUMENTS

| | | |
|---|---|---|
| JP | 07-152498 A | 6/1995 |
| JP | 2009-110346 A | 5/2009 |
| WO | 2014/068773 A1 | 5/2014 |

*Primary Examiner* — Mano Padmanabhan
*Assistant Examiner* — Patrick W Borges
(74) *Attorney, Agent, or Firm* — Volpe and Koenig, P.C.

(57) ABSTRACT

Provided is a performance information management system which includes a target apparatus having a plurality of components as monitoring targets and a management computer for managing the target apparatus and which manages performance information of the target apparatus with the management computer, wherein the target apparatus is capable of acquiring performance information for each monitoring target, and the management computer is configured to: allocate an initial storage area of which capacity differs for each monitoring target to each of the monitoring targets; detect depletion of a storage area allocated to a monitoring target when attempting to store the performance information of the monitoring target to the storage area; additionally allocate a consecutive storage area with a prescribed capacity to the monitoring target with the depleted storage area; and store the performance information of the monitoring target in the additionally-allocated storage area.

10 Claims, 21 Drawing Sheets

(56) References Cited

U.S. PATENT DOCUMENTS

| | | | |
|---|---|---|---|
| 2008/0229003 A1* | 9/2008 | Mizushima | G06F 12/0804 |
| | | | 711/103 |
| 2008/0301763 A1* | 12/2008 | Sasaki | G06F 3/065 |
| | | | 726/1 |
| 2011/0113207 A1* | 5/2011 | Fiske | G06F 17/30135 |
| | | | 711/162 |
| 2012/0110263 A1 | 5/2012 | Fujita et al. | |
| 2012/0330711 A1* | 12/2012 | Jain | G06F 9/5072 |
| | | | 705/7.23 |
| 2014/0032817 A1* | 1/2014 | Bux | G06F 12/0246 |
| | | | 711/103 |
| 2015/0169442 A1* | 6/2015 | Fisher | G06F 12/0253 |
| | | | 711/103 |
| 2015/0268861 A1* | 9/2015 | Bux | G06F 12/0646 |
| | | | 711/103 |
| 2016/0092120 A1* | 3/2016 | Liu | G06F 3/0616 |
| | | | 711/103 |

\* cited by examiner

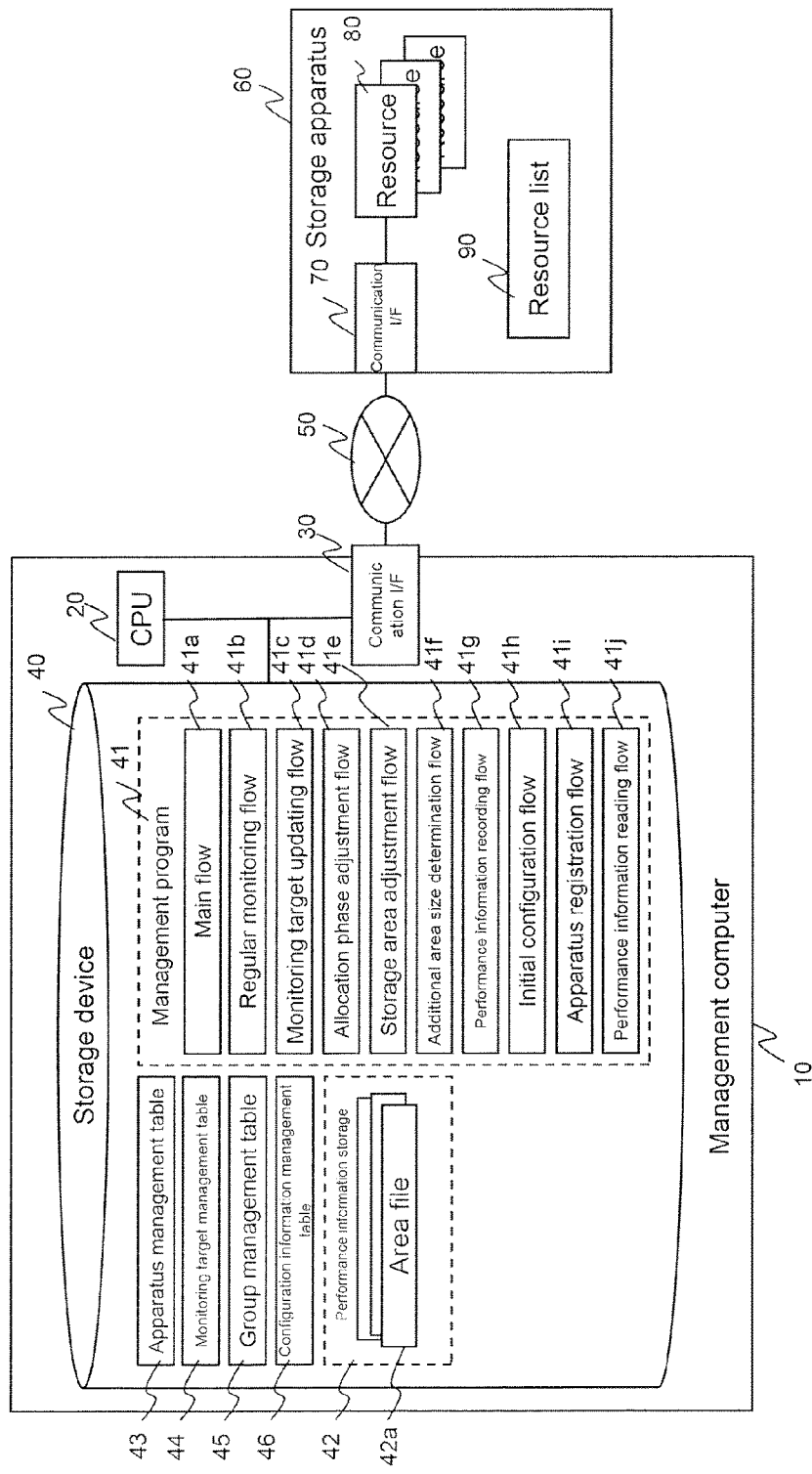

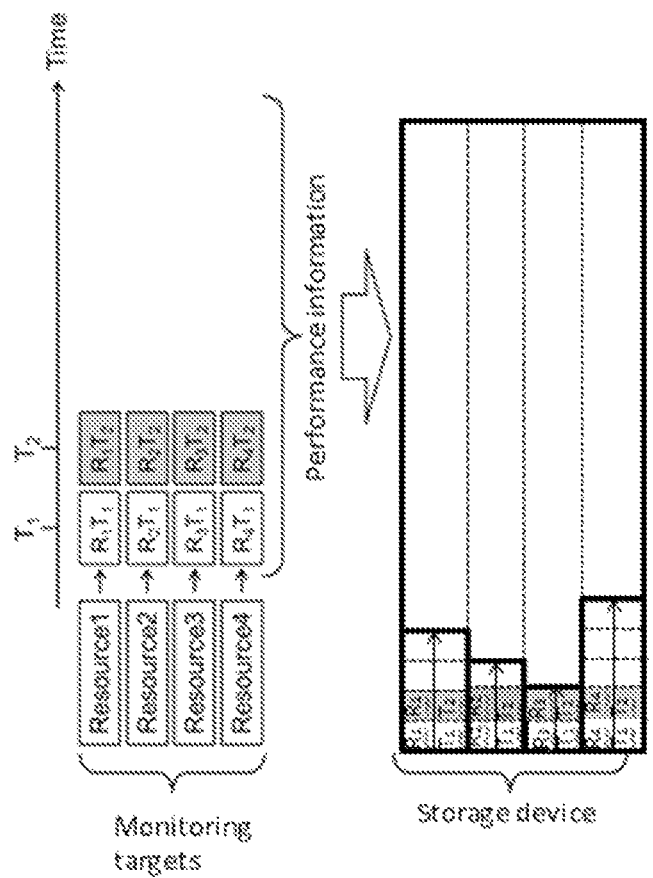

Fig. 14

| Device Name | IP Address |
|---|---|
| STORAGE1 | 192.0.2.1 |
| STORAGE2 | 192.0.2.2 |

Fig. 15

| Resource Name | Device Name | Group ID |
|---|---|---|
| LDEV1 | STORAGE1 | 1 |
| LDEV2 | STORAGE1 | 2 |
| LDEV3 | STORAGE1 | 3 |
| LDEV4 | STORAGE1 | 4 |
| LDEV1 | STORAGE2 | 5 |
| LDEV2 | STORAGE2 | 6 |
| LDEV3 | STORAGE2 | 7 |

Fig. 16

| Group ID | Num. of Resource | Allocation Phase | Data File ID | File Name | Total Capacity | Free Capacity | Current Offset |
|---|---|---|---|---|---|---|---|
| 1 | 1 | 1 | GROUP1 | GROUP1_2014-03-26 | 64 | 8 | 56 |
| 2 | 1 | 10 | GROUP2 | GROUP2_2014-03-26 | 64 | 16 | 48 |
| 3 | 1 | 19 | GROUP3 | GROUP3_2014-03-26 | 64 | 24 | 40 |
| 4 | 1 | 28 | GROUP4 | GROUP4_2014-03-26 | 64 | 32 | 32 |
| 5 | 1 | 37 | GROUP5 | GROUP5_2014-03-26 | 64 | 40 | 24 |
| 6 | 1 | 46 | GROUP6 | GROUP6_2014-03-26 | 64 | 48 | 16 |
| 7 | 1 | 55 | GROUP7 | GROUP7_2014-03-26 | 64 | 56 | 8 |
| 8 | 0 | N/A | GROUP8 | GROUP8_2014-03-26 | 0 | 0 | 0 |

Fig. 17

| Item | Value |
|---|---|
| MAX Num. of Groups | 8 |
| Allocation Unit Size | 64 |
| MIN Allocation Rate | 0.7 |
| Data Directory | C:\DATAFILES |

Fig. 18

| ... | LDEV1 | 2014-03-26 17:00:00 | 50 | LDEV1 | 2014-03-26 17:01:00 | 80 | LDEV1 | 2014-03-26 17:02:00 | 65 | | |

PERFORMANCE INFORMATION MANAGEMENT SYSTEM, MANAGEMENT COMPUTER, AND PERFORMANCE INFORMATION MANAGEMENT METHOD

TECHNICAL FIELD

The present invention relates to a technique for acquiring performance information from a monitoring target and managing the acquired performance information.

BACKGROUND ART

Claim 1 of PTL 1 discloses a method of "acquiring performance information of a volume of a storage, registering the acquired performance information in a storage unit as storage performance history information in a time series, and managing the storage performance history information". Paragraph 0033 in PTL 1 states "regularly acquiring performance information and storing the acquired performance information in a storage performance history table".

CITATION LIST

Patent Literature

[PTL 1]
Japanese Patent Application Publication No. 2009-110346

SUMMARY OF INVENTION

Technical Problem

However, as regularly acquired performance information is sequentially stored in a table, a plurality of pieces of performance information regarding different resources but acquired on the same occasion are to be stored in adjacent storage areas. In this case, a plurality of pieces of performance information acquired in a time series from a single resource are to be stored in storage areas that are separated from one another in the table. As a result, when attempting to collectively read, in respect of a specific resource, a plurality of pieces of performance information acquired in a certain period, a large number of random accesses occur.

Generally, since a random access entails performing a seek, a longer time is required for access as compared to a sequential access. Therefore, when a large number of random accesses occur, acquisition of performance information takes more time.

An object of the present invention is to provide a technique for reducing time required to read performance information.

Solution to Problem

A performance information management system according to an aspect of the present invention is a performance information management system which includes a target apparatus having a plurality of components as monitoring targets and a management computer for managing the target apparatus and which manages performance information of the target apparatus with the management computer, wherein the target apparatus is capable of acquiring performance information for each monitoring target, and the management computer is configured to: allocate an initial storage area of which capacity differs for each monitoring target to each of the monitoring targets; detect depletion of a storage area allocated to a monitoring target when attempting to store performance information of the monitoring target to the storage area; additionally allocate a consecutive storage area with a prescribed capacity to the monitoring target with the depleted storage area; and store the performance information of the monitoring target in the additionally-allocated storage area.

Advantageous Effects of Invention

According to the present invention, since performance information is sequentially stored while additionally allocating a storage area with a prescribed capacity to a monitoring target, performance information of a same monitoring target can be stored in a consecutive storage area while reducing an effect caused by a process of securing a consecutive area in advance and time required to read performance information can be reduced.

BRIEF DESCRIPTION OF DRAWINGS

FIG. 1 is a block diagram showing an information processing system.
FIG. 2C is a conceptual diagram for illustrating a general operation of a management computer.
FIG. 14 is a diagram showing an example of an apparatus management table.
FIG. 15 is a diagram showing an example of a monitoring target management table.
FIG. 16 is a diagram showing an example of a group management table.
FIG. 17 is a diagram showing an example of a configuration information management table.
FIG. 18 is a diagram showing an example of an area file.

DESCRIPTION OF EMBODIMENT

Figure 2A:
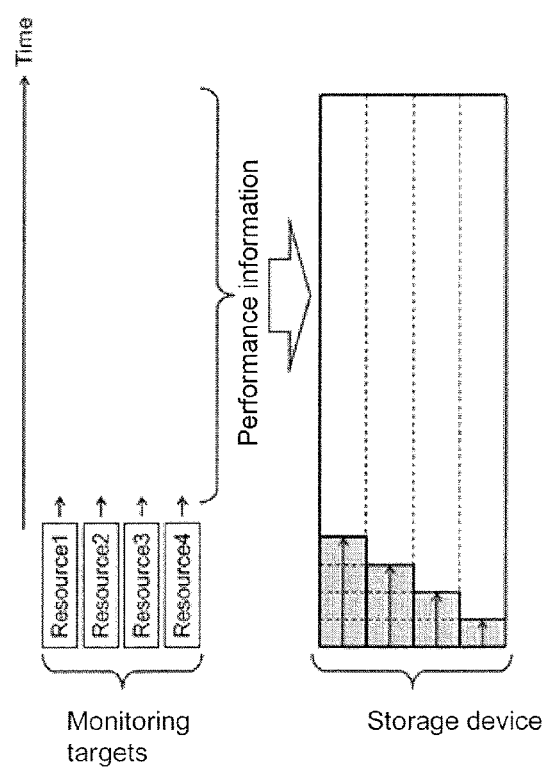
FIG. 2A is a conceptual diagram for illustrating a general operation of a management computer.

An embodiment of the present invention will be described with reference to the drawings.

While information according to the present invention will be described below using expressions such as an "aaa table", an "aaa list", an "aaa DB", and an "aaa queue", such information may be expressed without using data structures such as a table, a list, a DB, and a queue.

Therefore, in order to demonstrate that information is not dependent on data structure, an "aaa table", an "aaa list", an "aaa DB", an "aaa queue", and the like may sometimes be referred to as "aaa information".

Furthermore, while the expressions "identification information", "identifier", "name", and "ID" are used when describing contents of the respective pieces of information, these expressions are interchangeable.

While a "program" is sometimes used as a subject in the following description, since a program causes prescribed processing to be performed using a memory and a communication port (a communication control device) by being executed by a processor, a "processor" may be used as a subject in the following description. In addition, processing disclosed using a program as a subject may be considered processing performed by a computer or an information processing apparatus such as a management server. Furthermore, a program may be partially or entirely realized by dedicated hardware.

In addition, various programs may be installed in various computers from a program distribution server or via storage media that can be read by a computer. In this case, the program distribution server includes a CPU and a storage resource, and the storage resource further stores a distribution program and a program that is a distribution target. Furthermore, by executing the distribution program, the CPU of the program distribution server distributes the program that is the distribution target to other computers.

Moreover, a management computer includes an input/output device. While conceivable examples of an input/output device include a display, a keyboard, and a pointer device, other devices may be used. Furthermore, by adopting a serial interface or an Ethernet interface (Ethernet is a registered trademark) as an alternative to an input/output device, coupling a display computer including a display, a keyboard, or a pointer device to the interface, and transmitting display information to the display computer or receiving input information from the display computer, input and display using an input/output device may be substituted by displaying on the display computer and accepting input from the display computer.

Hereinafter, a set of one or more computers which manage an information processing system and which displays display information according to the present invention may be referred to as a management system. When a management computer displays display information, the management computer constitutes a management system. In addition, a combination of a management computer and a display computer also constitutes a management system. Furthermore, processes identical or similar to those of a management computer may be realized by a plurality of computers in order to increase speed or reliability of a management process. In this case, the plurality of computers (when a display computer performs display, including the display computer) constitute a management system.

FIG. 1 is a block diagram showing an information processing system according to the present embodiment. Referring to FIG. 1, the information processing system includes a storage apparatus 60 and a management computer 10. The management computer 10 and the storage apparatus 60 are coupled to one another via a network 50.

The storage apparatus 60 is an apparatus which stores data in the information processing system and includes a communication interface (I/F) 70 and a plurality of resources 80. The communication I/F 70 is a device which performs communication via the network 50. The resources 80 are physical or logical resources included in the storage apparatus 60 and an LDEV included in the storage apparatus 60 is an example of the resource 80. The resources 80 are managed based on information in a resource list 90. The storage apparatus 60 can acquire performance information for each resource 80 and each resource 80 becomes a monitoring target of performance information.

Meanwhile, the management computer 10 is a metric collection server which considers the storage apparatus 60 to be a target apparatus and manages performance information by considering each resource 80 of the storage apparatus 60 to be a monitoring target.

FIGS. 2A to 2D are conceptual diagrams for illustrating general operations of the management computer 10. In this case, it is assumed that Resource 1 to Resource 4 are available as resources 80 that are monitoring targets and performance information of Resource 1 to Resource 4 is to be regularly acquired.

First, as an initial state, as shown in FIG. 2A, the management computer 10 allocates an initial storage area of which capacity differs for each monitoring target to each of the monitoring targets. In the example shown in FIG. 2A, an initial storage area of 4 units is allocated to the Resource 1, 3 units to the Resource 2, 2 units to the Resource 3, and 1 unit to the Resource 4, and the storage areas are secured in a storage device of the management computer 10.

Figure 2B:
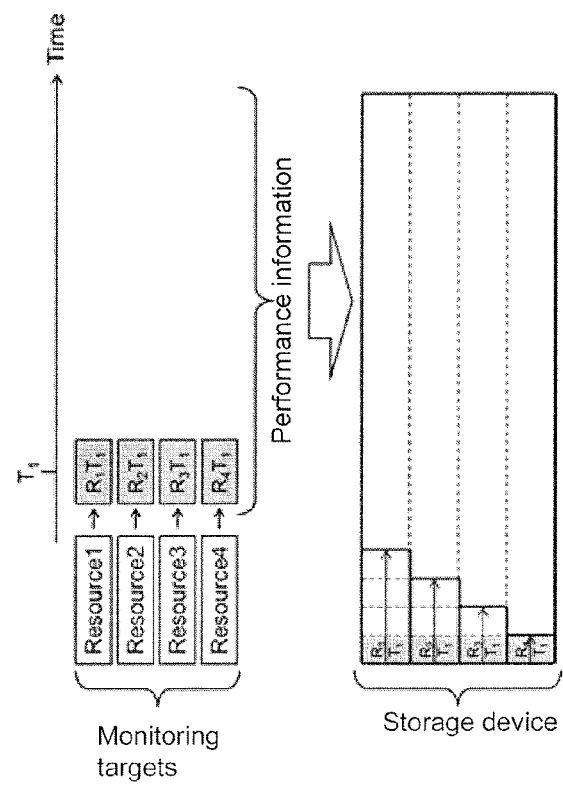
FIG. 2B is a conceptual diagram for illustrating a general operation of a management computer.

In addition, the management computer 10 stores performance information of a monitoring target in a storage area allocated to the monitoring target. In FIG. 2B, upon arrival of a time point $T_1$, performance information $R_1T_1$ of the Resource 1, performance information $R_2T_1$ of the Resource 2, performance information $R_3T_1$ of the Resource 3, and performance information $R_4T_1$ of the Resource 4 are acquired and stored in the storage device.

When detecting depletion of a storage area when attempting to store performance information of a monitoring target in the storage area, the management computer 10 additionally allocates a consecutive storage area with a prescribed capacity to the monitoring target of which the storage area has been depleted and stores the performance information of the monitoring target in the additionally-allocated storage area. A consecutive storage area as described herein refers to a consecutive storage area which enables sequential access. In FIG. 2C, upon arrival of a time point $T_2$, performance information $R_1T_2$ of the Resource 1, performance information $R_2T_2$ of the Resource 2, performance information $R_3T_2$ of the Resource 3, and performance information $R_4T_2$ of the Resource 4 are acquired. When storing these pieces of information in storage areas, since a storage area of the Resource 4 has been depleted, the management computer 10 additionally allocates a storage area of 4 units to the Resource 4 and stores performance information $R_4T_2$ therein.

Figure 2D:
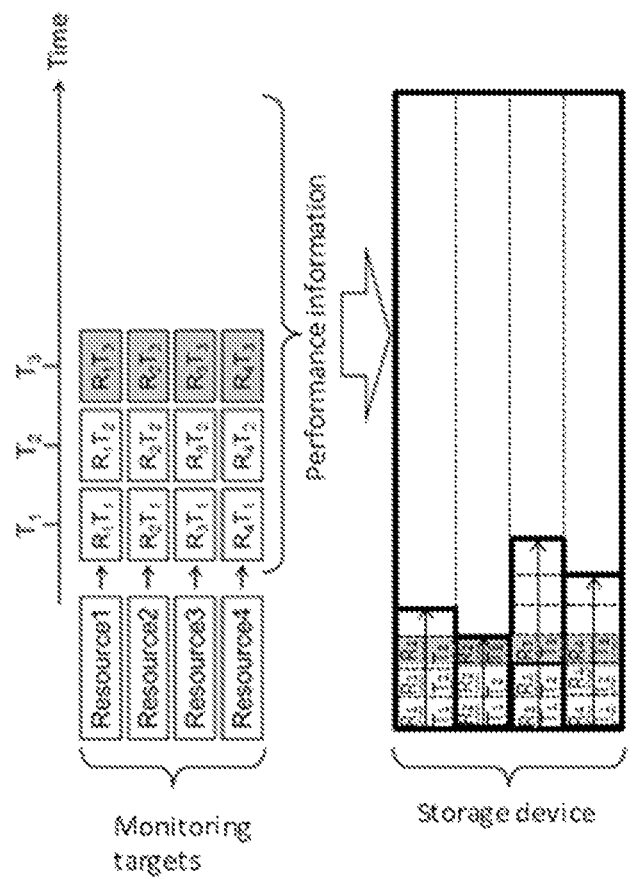
FIG. 2D is a conceptual diagram for illustrating a general operation of a management computer.

In a similar manner, in FIG. 2D, upon arrival of a time point $T_3$, performance information $R_1T_3$ of the Resource 1, performance information $R_2T_3$ of the Resource 2, performance information $R_3T_3$ of the Resource 3, and performance information $R_4T_3$ of the Resource 4 are acquired. When storing these pieces of information in storage areas, since a storage area of the Resource 3 has been depleted, the management computer 10 additionally allocates a storage area of 4 units to the Resource 3 and stores performance information $R_3T_3$ therein.

In this manner, in the present embodiment, since performance information is sequentially stored while additionally allocating a storage area with a prescribed capacity to a monitoring target, performance information of a same monitoring target can be stored in a consecutive storage area and the time required to read performance information can be reduced.

Moreover, while the Resources 1 to 4 are individually considered monitoring targets and a storage area is allocated to each monitoring target in FIGS. 2A to 2D, the present invention is not limited thereto. As another example, one or more resources may be grouped and a prescribed storage area may be allocated to the group. In this case, performance information of a monitoring target belonging to a certain group is to be stored in a storage area allocated to the group.

Figure 3:
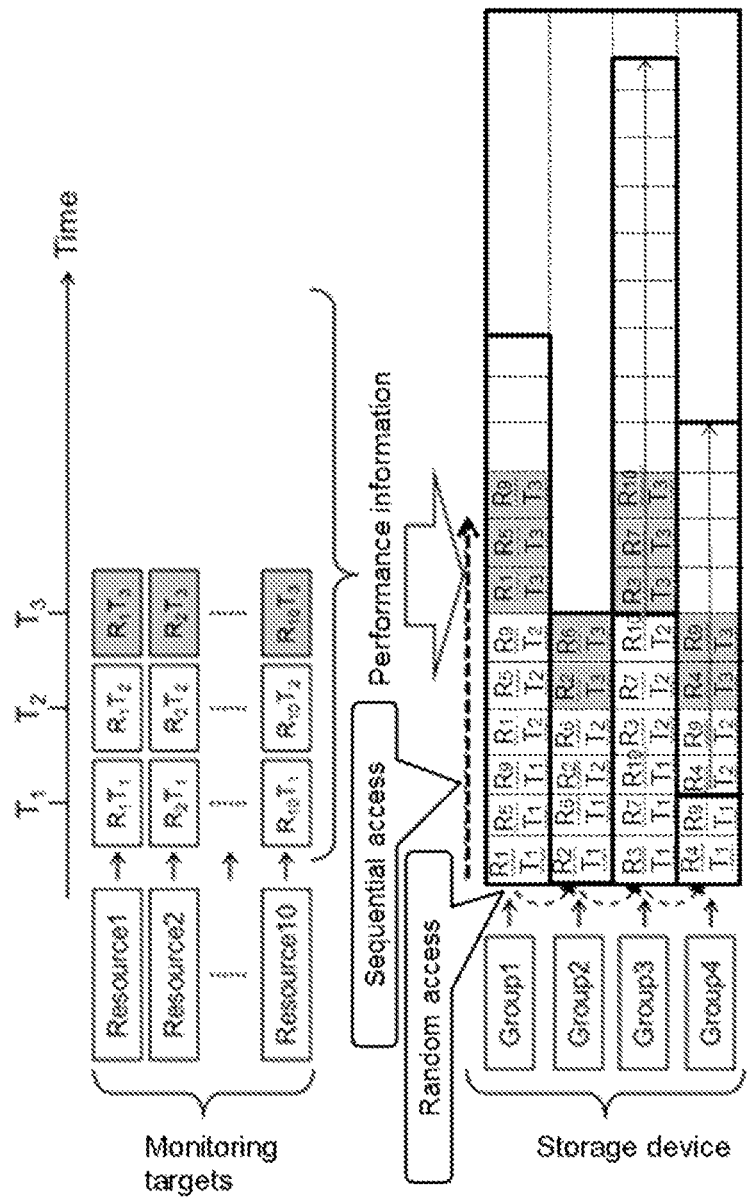
FIG. 3 is a conceptual diagram for illustrating a general operation of a management computer according to a modification.

FIG. 3 is a conceptual diagram for illustrating a general operation of the management computer 10 according to a modification. In this case, it is assumed that Resources 1 to 10 are available as the resources 80. In addition, the Resources 1, 5, and 9 belong to Group 1, the Resources 2 and 6 belong to Group 2, the Resources 3, 7, and 10 belong to Group 3, and the Resources 4 and 8 belong to Group 4.

Upon arrival of a time point $T_3$, the storage apparatus 60 acquires respective pieces of performance information of the Resources 1 to 10. In addition, the management computer 10 stores performance information $R_1T_3$ of the Resource 1, performance information $R_5T_3$ of the Resource 5, and performance information $R_9T_3$ of the Resource 9 in a storage area of the Group 1. Furthermore, the management computer 10 stores performance information $R_2T_3$ of the Resource 2 and performance information $R_6T_3$ of the Resource 6 in a storage area of the Group 2. When storing performance information $R_3T_3$ of the Resource 3, performance information $R_7T_3$ of the Resource 7, and performance information $R_{10}T_3$ of the Resource 10 in a storage area of the Group 3, since the storage area of the Group 3 has been depleted, the management computer 10 additionally allocates a storage area of 12 units to the Group 3 and subsequently stores the pieces of performance information therein. In addition, the management computer 10 stores performance information $R_4T_3$ of the Resource 4 and performance information $R_8T_3$ of the Resource 8 in a storage area of the Group 4.

Hereinafter, a configuration and operations of the management computer 10 will be described in greater detail. In the following description, a case of adopting the modification described above in which one or more resources are grouped and a prescribed storage area is allocated to the group will be described.

Referring to FIG. 1, the management computer 10 includes a CPU 20, a communication I/F 30, and a storage device 40. The communication I/F 30 is coupled to the network 50.

A management program 41, performance information 42, an apparatus management table 43, a monitoring target management table 44, a group management table 45, and a configuration information management table 46 are recorded on the storage device 40.

The management program 41 includes respective programs of a main flow 41a, a regular monitoring flow 41b, a monitoring target updating flow 41c, an allocation phase adjustment flow 41d, a storage area adjustment flow 41e, an additional area size determination flow 41f, a performance information recording flow 41g, an initial configuration flow 41h, an apparatus registration flow 41i, and a performance information reading flow 41j. These programs are executed by the CPU 20. When executing these programs, the CPU 20 uses information in the apparatus management table 43, the monitoring target management table 44, the group management table 45, and the configuration information management table 46, and accumulates acquired data in an area file 42a of the performance information 42.

Figure 4:
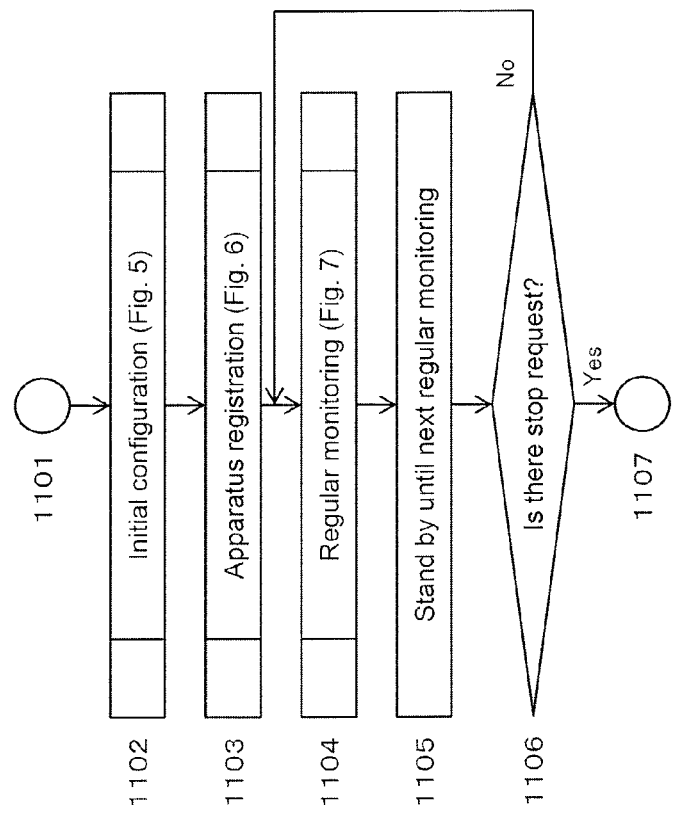
FIG. 4 is a flow chart of a main flow in a management program.

FIG. 4 is a flow chart of the main flow 41a in the management program 41 according to the present embodiment. Referring to FIG. 4, the CPU 20 of the management computer 10 (which may be rephrased as "the management program 41"; the same logic applies hereinafter) first performs initial configuration upon, for example, system startup (step 1102). Initial configuration includes a process of registering information of a group to a table in accordance with configuration information set in advance. A detailed process of initial configuration will be described later with reference to FIG. 5.

Next, the CPU 20 performs apparatus registration (step 1103). Apparatus registration is a process of registering information of the storage apparatus 60 in a table. A detailed process of apparatus registration will be described later with reference to FIG. 6.

After completing initial configuration and apparatus registration, the CPU 20 executes regular monitoring process once (step 1104). Regular monitoring is a process of acquiring and recording performance information of a monitoring target. A detailed process of regular monitoring will be described later with reference to FIG. 7. After the regular monitoring process is performed once, the management computer 10 stands by until a time point where next regular monitoring is executed arrives (step 1105).

Next, the management computer 10 determines whether or not a request has been made to stop continuous regular monitoring (step 1106). When a stop request has not been made, the management computer 10 returns to step 1104, but when a stop request has been made, the management computer 10 ends the process. A stop request occurs due to, for example, power of the system being turned off.

Figure 5:
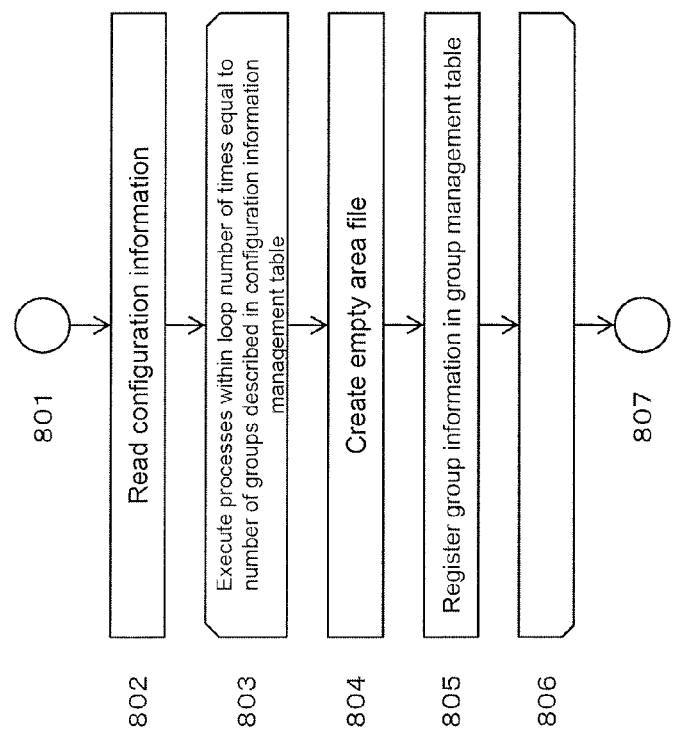
FIG. 5 is a flow chart showing detailed processes of an initial configuration flow.

FIG. 5 is a flow chart showing detailed processes of the initial configuration flow 41h described earlier. Initial configuration is a first process to be performed when operating the system.

The CPU 20 first reads configuration information from the configuration information management table 46 (step 802). Configuration information includes information necessary for operation of the system such as the number of groups.

Next, the CPU 20 executes processes within a loop (step 803 to 806) a number of times equal to the number of groups described in the configuration information management table 46.

In step 804, the CPU 20 creates empty files for recording performance information in the disk apparatus, the number of created empty files being equal to the number of groups. One file is created for one group. In the example of the configuration information management table 46 shown in FIG. 17, since a maximum number of groups is eight, eight area files 42a are created.

In FIG. 17, MAX Num. of Groups indicates a maximum number of groups, Allocation Unit Size indicates a size of a storage area that is increased in one allocation, MIN Allocation Rate is information representing, by a proportion, a threshold for determining whether a timing at which a storage area is to be additionally allocated due to depletion of free area is close to or far from an originally-planned timing of additional allocation of a storage area, and Data Directory indicates a directory at a storage destination of an area file.

In step 805, the CPU 20 records a file name and the like of the created area files 42a in the group management table 45. The file names of the area files 42a are determined in accordance with a rule set in advance. In the example of the group management table 45 shown in FIG. 16, a file name has a format in which a date is added to a data file ID.

In FIG. 16, Group ID indicates identification information of a group, Number of Resources indicates the number of monitoring targets, Allocation Phase indicates information on what timing a storage area is to be allocated, Data File ID indicates identification information of the area file 42a created in initial configuration, File Name indicates a file name, Total Capacity indicates a capacity of an entire file, Free Capacity indicates a free capacity of a file, and Current Offset indicates a distance from a head of a file to a next writing start position.

Figure 6:
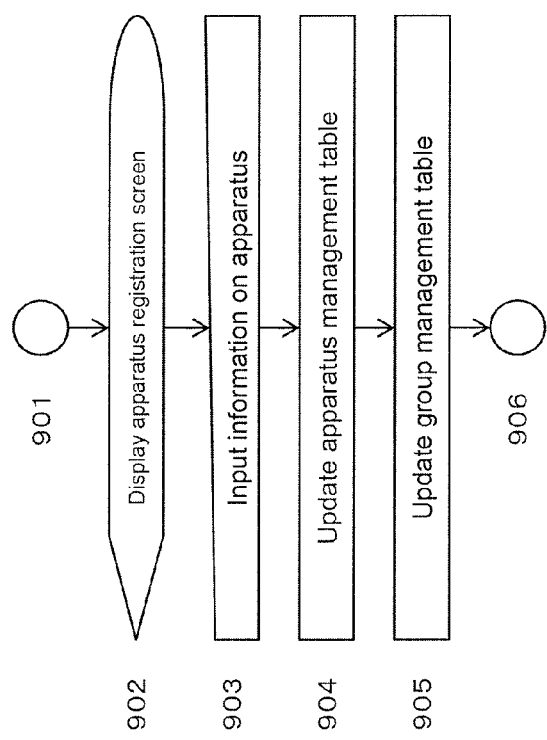
FIG. 6 is a flow chart showing detailed processes of an apparatus registration flow.

FIG. 6 is a flow chart showing detailed processes of the apparatus registration flow 41i described earlier. Apparatus registration is a process of registering the storage apparatus 60 to be monitored.

The CPU 20 first displays an apparatus registration screen (step 902). In addition, the CPU 20 accepts input of information of the storage apparatus 60 on the registration screen (step 903). Furthermore, the CPU 20 records the input information in the apparatus management table 43 (step 904). In the example of the apparatus management table 43 shown in FIG. 14, names of two storage apparatuses and IP addresses as uniquely-determined identification information which enable coupling to the apparatuses are registered. In addition, when necessary, the CPU 20 updates the group management table 45 in accordance with the information (step 905). For example, by allocating an apparatus to a group, the number of monitoring targets indicated in Num. of Resources of the group increases.

Figure 7:
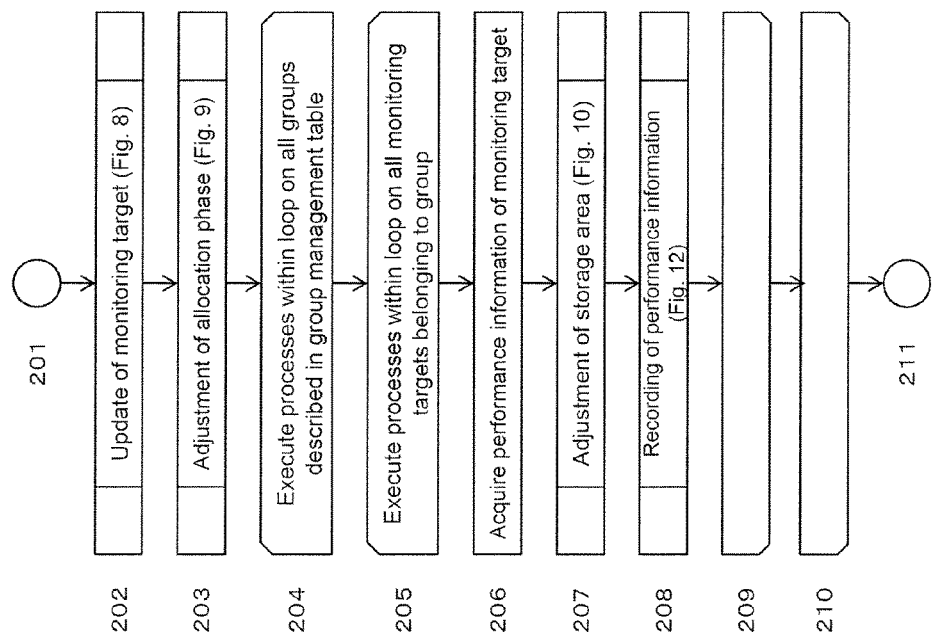
FIG. 7 is a flow chart showing detailed processes of a regular monitoring flow.

FIG. 7 is a flow chart showing detailed processes of the regular monitoring flow 41b described earlier.

The CPU 20 first updates monitoring targets (step 202). In a state where only initial configuration and apparatus registration have been completed such as immediately after startup of the system, although information of the storage apparatus 60 is registered in a table, information indicating what resources are included in the storage apparatus 60 as monitoring targets is not registered in a table. Step 202 is a process for registering or updating the monitoring targets. Details of the process performed in step 202 will be described later with reference to FIG. 8.

Next, the CPU 20 performs adjustment of an allocation phase (step 203). Step 203 is a process for determining, for each monitoring target, in which phase allocation is to be performed with respect to a group to which a storage area is to be allocated. Details of the process performed in step 203 will be described later with reference to FIG. 9.

After updating the monitoring targets and adjusting the allocation phase, with a double loop constituted by a loop of steps 204 to 210 and a loop of steps 205 to 209, the CPU 20 executes processes within the loops (steps 206 to 208) with respect to all monitoring targets belonging to all groups described in the group management table 45.

In step 206, the CPU 20 acquires performance information of monitoring targets. Performance information is a monitored value of temperature, disk speed, or the like.

In step 207, when necessary, the CPU 20 additionally allocates a storage area to a monitoring target. Details of the process performed in step 207 will be described later with reference to FIG. 10.

In step 208, the CPU 20 writes performance information into a file. Details of the process in step 208 of recording performance information will be described later with reference to FIG. 12.

Figure 8:
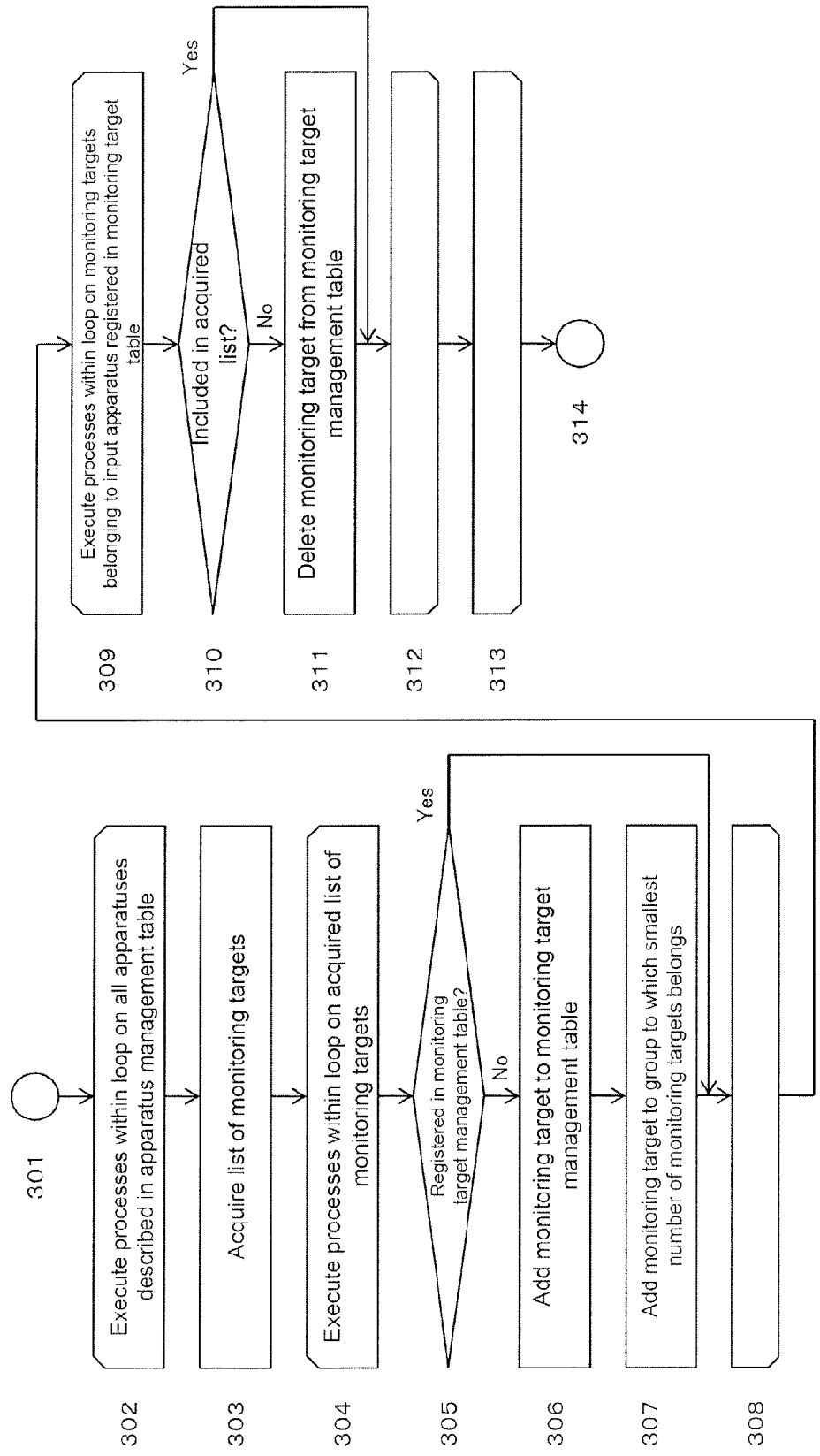
FIG. 8 is a flow chart showing detailed processes of updating of a monitoring target.

FIG. 8 is a flow chart showing detailed processes of updating of a monitoring target described earlier.

The CPU 20 executes processes within a loop (steps 303 to 312) with respect to all storage apparatuses 60 described in the apparatus management table 43. In step 303, the CPU 20 acquires a resource list 90 retained by the storage apparatus 60. The resource list 90 describes a list of monitoring targets included in the storage apparatus 60.

Next, the CPU 20 executes processes within a loop (steps 305 to 307) with respect to each monitoring target included in the acquired list of monitoring targets. In step 305, the CPU 20 determines whether or not a monitoring target of interest is registered in the monitoring target management table 44. When the monitoring target of interest is already registered in the monitoring target management table 44, the CPU 20 performs no process on the monitoring target and migrates to a next monitoring target.

On the other hand, when the monitoring target of interest is not registered in the monitoring target management table 44, the CPU 20 adds the monitoring target to the monitoring target management table 44 (step 306) and further adds the monitoring target to a group with a smallest number of monitoring targets belonging thereto (step 307). This is performed to make, to the greatest extent possible, the numbers of monitoring target belonging the respective groups the same.

When processes of steps 304 to 308 are completed for all monitoring targets described in the list of monitoring targets, the CPU 20 next executes processes within a loop (steps 310 and 311) with respect to all monitoring targets described in the monitoring target management table 44. In step 310, the CPU 20 determines whether or not a monitoring target of interest is described in the resource list 90. When the monitoring target of interest is described in the resource list 90, the CPU 20 performs no process on the monitoring target and migrates to a next monitoring target. On the other hand, when the monitoring target of interest is not registered in the resource list 90, the CPU 20 deletes the monitoring target from the monitoring target management table 44 (step 311). This is a process of deleting, from the monitoring target management table 44, a monitoring target which has actually been deleted but which still remains in the monitoring target management table 44.

Figure 9:
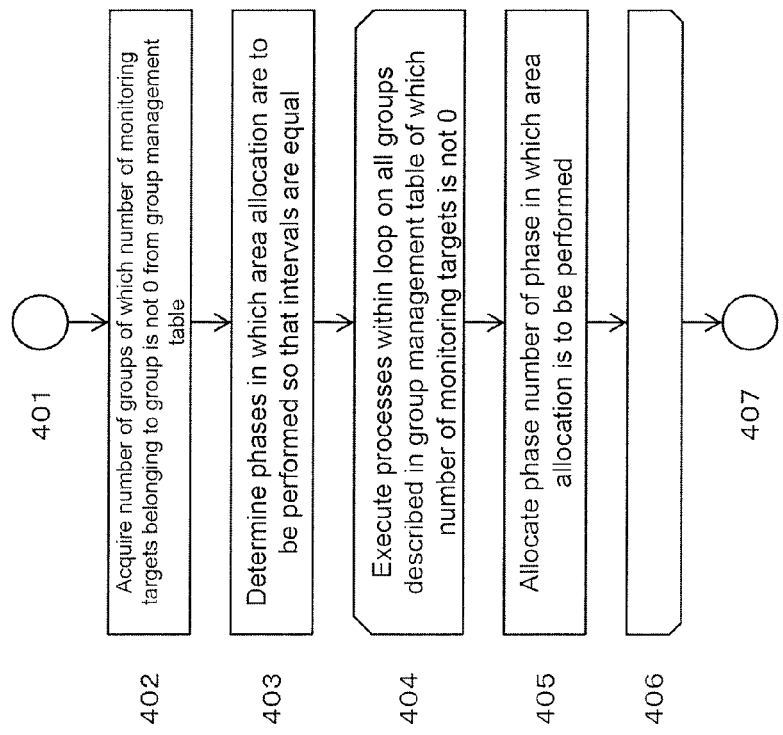
FIG. 9 is a flow chart of an allocation phase adjustment flow.

FIG. 9 is a flow chart of the allocation phase adjustment flow 41d described earlier.

First, the CPU 20 acquires the number of groups of which the number of monitoring targets belonging to the group is not zero from the group management table 45 (step 402). In the group management table 45 shown in FIG. 16, Num. of Resources indicates the number of monitoring targets belonging to each group. In the example shown in FIG. 16, the Groups 1 to 7 respectively have one monitoring target and the Group 8 has zero monitoring targets. Since zero monitoring targets means that there is no performance information to be recorded, such groups are eliminated from targets of allocation phase adjustment. In the example shown in FIG. 16, information describing seven as the number of groups is acquired in the process of step 402.

In next step 403, the CPU 20 determines an allocation phase (timing) in which a storage area is allocated so that time intervals become equal with respect to the number of groups acquired in step 402. For example, when there are a prescribed number of phases adoptable as an allocation phase, an allocation phase may be indicated by a number (an allocation phase number) of an allocation phase selected therefrom.

In the example shown in FIG. 17, since Allocation Unit Size is 64, there are 64 adoptable phases. In other words, the total number of phases is 64. Seven phases are selected from the 64 phases so that time intervals become most equal. Allocation Phase shown in FIG. 16 indicates seven phases determined so as to be equally dispersed. FIG. 16 shows that Allocation Phases 1, 10, 19, 28, 37, 46, 55 or, in other words, one allocation phase in approximately every nine allocation phases has been selected.

The CPU 20 executes processes within a loop (steps 404 to 406) with respect to each group of which the number of monitoring targets is not zero and which is described in the group management table 45. In step 405, the CPU 20 allocates a phase number of a phase in which a storage area is to be allocated with respect to a group of interest.

Figure 10:
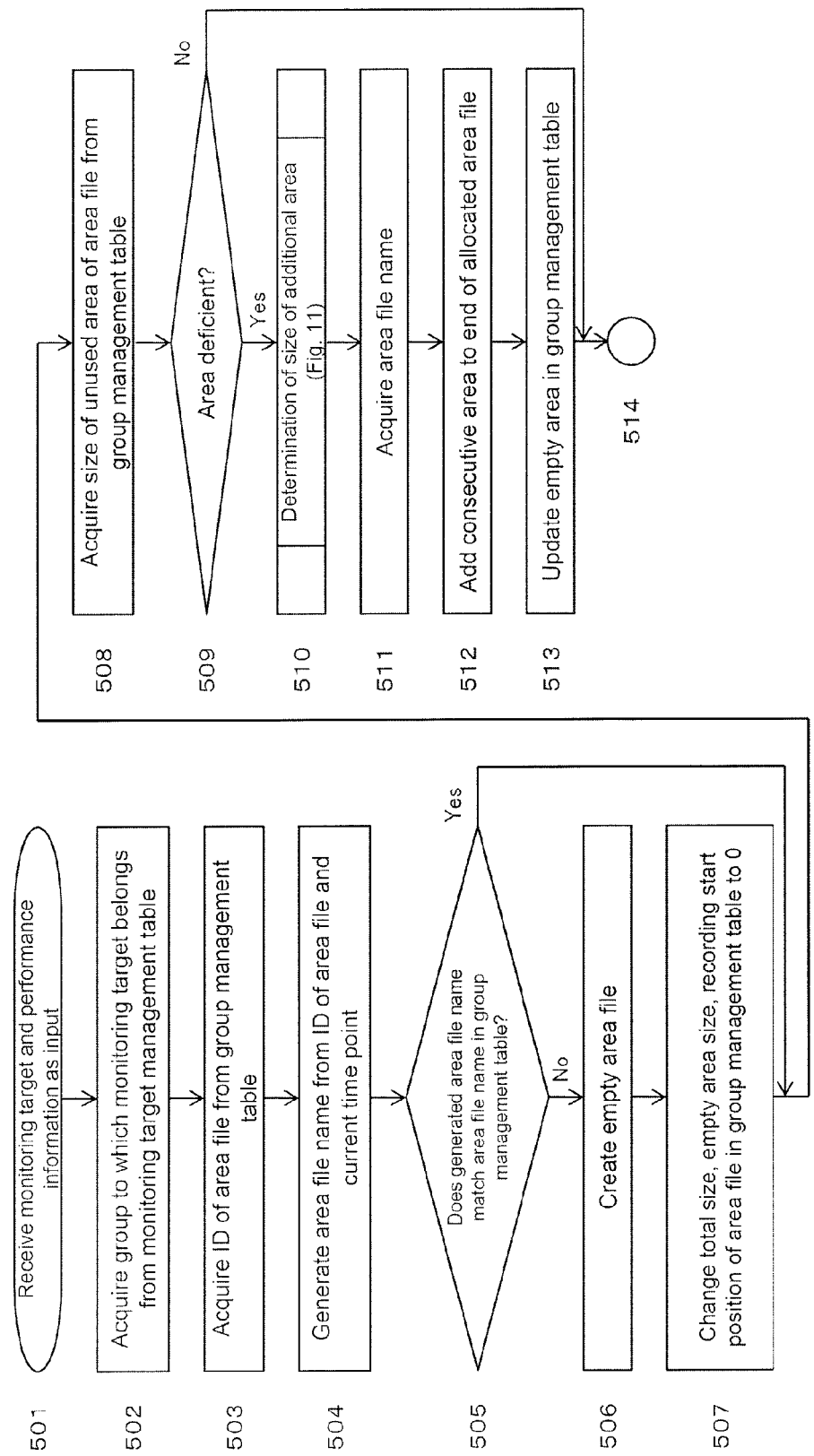
FIG. 10 is a flow chart showing detailed processes of a storage area adjustment flow.

FIG. 10 is a flow chart showing detailed processes of the storage area adjustment flow 41e described earlier. The storage area adjustment flow 41e is a process performed when recording acquired performance information to adjust a storage area and secure an area to which the performance information is to be recorded, and accepts information indicating a monitoring target for which performance information has been acquired and the acquired performance information as input.

First, the CPU 20 acquires information of a group to which each monitoring target belongs from the monitoring target management table 44 (step 502). The monitoring target management table 44 records information including a resource name of a monitoring target, an apparatus name of the storage apparatus 60 including the resource, and a group ID of a group to which the monitoring target belongs. For example, the CPU 20 may acquire, in association with each other, a resource name of a monitoring target and a group ID of a group to which the monitoring target belongs.

In the example of the monitoring target management table 44 shown in FIG. 15, Resource Name indicates a resource name of a monitoring target, Device Name indicates an apparatus name of the storage apparatus 60, and Group ID indicates a group ID of a group. The monitoring target management table 44 shown in FIG. 15 shows that, for example, the Group ID of a group to which a monitoring target having Resource Name of LDEV1 belongs is 1.

Next, the CPU 20 acquires an ID of the area file 42a (Data File ID shown in FIG. 16) from the group management table 45 (step 503). Subsequently, the CPU 20 generates a file name of the area file 42a from the acquired ID of the area file 42a and a current time point (step 504). In the example shown in FIG. 16, a file name has a format in which a date is added to a data file ID.

Next, the CPU 20 determines whether or not the file name generated in step 504 matches a file name of the area file 42a described in the group management table 45 (step 505).

When the file name generated in step 504 does not match the file name of the area file 42a described in the group management table 45, the CPU 20 newly generates an empty area file 42a for recording the performance information of the group acquired in step 502 (step 506). Furthermore, in the group management table 45, the CPU 20 sets a total size, an empty area size, and a recording start position of the area file 42a generated in step 506 to 0 as initial values (step 507).

In the example of the group management table 45 shown in FIG. 16, a format of File Name is obtained by adding a date to Data File ID which is identification information attached to a file for each group. Therefore, performance information of each group is accumulated in a daily area file. In this case, when a date changes, a No determination is made in the determination of step 505 or, in other words, a mismatch of file names occurs, a new area file 42a is created in step 506 and, in step 507, File Name corresponding the group for which the area file 42a is newly created is rewritten and Total Capacity, Free Capacity, and Current Offset are cleared to 0 in the group management table 45 shown in FIG. 16.

After step 507 or when a Yes determination is made in step 505, the CPU 20 next acquires a size of an unused area (an empty area) of the area file 42a from the group management table 45 (step 508). In addition, the CPU 20 determines whether or not the empty area of the area file 42a is insufficient for storing the performance information acquired in step 206 (step 509).

In the example shown in FIG. 16, since free capacity is indicated as Free Capacity, the CPU 20 may compare a data amount of the performance information acquired in step 206 with a value of Free Capacity and determine that the empty area of the area file 42a is insufficient when the data amount of performance information exceeds the value of Free Capacity.

When the empty area is determined not to be insufficient, since there is no need to additionally allocate a storage area, the CPU 20 ends the process of the storage area adjustment flow 41e without further modification. When the empty area is determined to be insufficient, since there is a need to additionally allocate a storage area, the CPU 20 first determines a size of an additional area (step 510). Details of the process performed in step 510 will be described later with reference to FIG. 11.

Once the size of an additional area is determined, the CPU 20 next acquires a file name of the area file 42a to which a storage area is to be additionally allocated (step 511) and adds the consecutive storage area with the capacity determined in step 510 to an end of the area file 42a of which a file name is acquired in step 511 (step 512). Finally, since a free capacity of the area file 42a has changed, the CPU 20 reflects the change in the group management table 45 (step 513).

Figure 11:
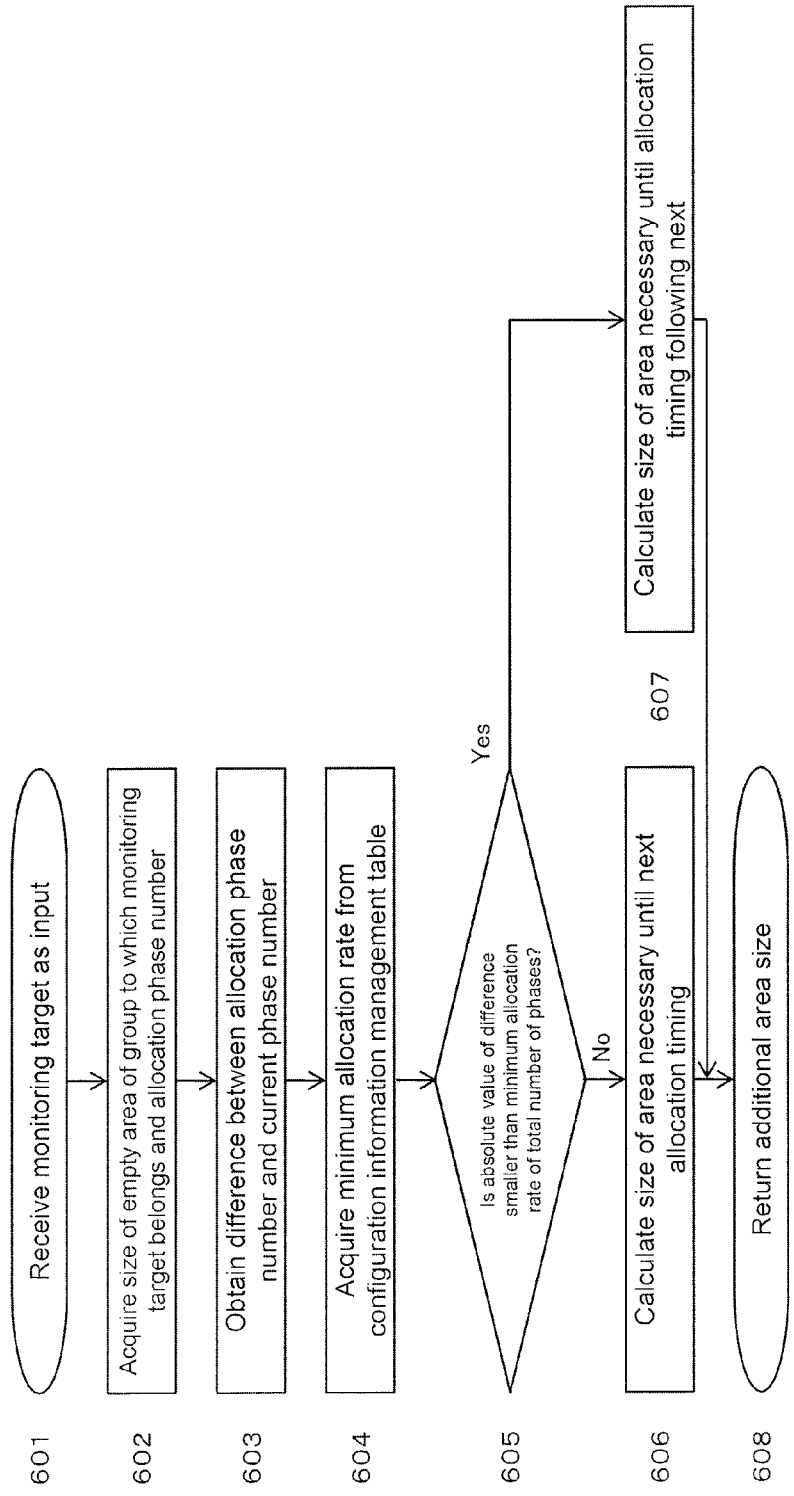
FIG. 11 is a flow chart of an additional area size determination flow.

FIG. 11 is a flow chart of the additional area size determination flow 41f described earlier. The additional area size determination flow 41f is a process of determining a capacity of a storage area to be additionally allocated to the area file 42a of which an area is insufficient when recording performance information, and accepts information indicating a monitoring target as an input.

First, with respect to a group to which the monitoring target belongs, the CPU 20 acquires a size of an empty area and an allocation phase number (step 602). Next, the CPU 20 obtains a difference between the allocation phase number acquired in step 602 and a current phase number (step 603). Subsequently, the CPU 20 acquires a minimum allocation rate from the configuration information management table 46 (step 604). In the example of the configuration information management table shown in FIG. 17, MIN Allocation Rate indicates a minimum allocation rate and a value thereof is 0.7 (in other words, 70%).

In addition, the CPU 20 determines whether or not an absolute value of the difference obtained in step 603 is smaller than a minimum allocation rate of a total number of phases (step 605). When the absolute value of the difference is smaller than the minimum allocation rate of a total number of phases, a period until a next allocation phase may be considered relatively small in terms of a relationship with the total number of phases. In this case, the CPU 20 calculates an additional area size on the assumption that a storage area up to an allocation phase (allocation timing) following the next is to be added to the area file 42*a* (step 607).

On the other hand, when the absolute value of the difference is equal to or larger than the minimum allocation rate of a total number of phases, a period until a next allocation phase may be considered relatively large in terms of a relationship with the total number of phases. In this case, the CPU 20 calculates an additional area size on the assumption that a storage area up to a next allocation phase (allocation timing) is to be added to the area file 42*a* (step 606).

Finally, the CPU 20 returns a value of the additional area size and ends the process (step 608).

Figure 12:
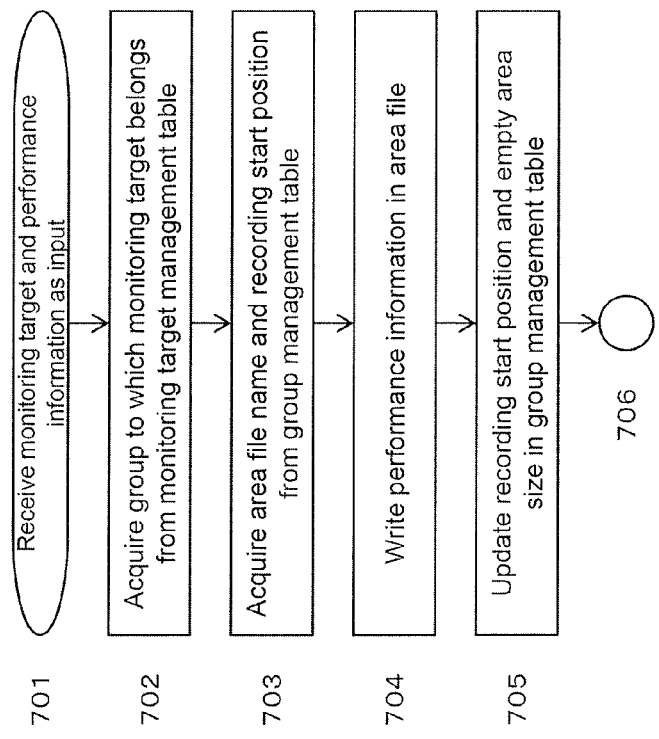
FIG. 12 is a flow chart of a performance information recording flow.

FIG. 12 is a flow chart of the performance information recording flow 41*g* described earlier. The performance information recording flow 41*g* is a process of recording the performance information acquired in step 206 in a storage area of the area file 42*a*.

First, the CPU 20 receives a monitoring target and performance information acquired from the monitoring target as input (step 701). The CPU 20 refers to the monitoring target management table 44 and acquires a group to which the monitoring target belongs (step 702), and refers to the group management table 45 to acquire a file name of the area file 42*a* in which performance information of the group is to be recorded and a position at which recording of the performance information is to be started (step 703).

In addition, the CPU 20 writes the performance information in the area file 42*a* with the acquired area file name (step 704). Once performance information has been written, the CPU 20 updates information on a recording start position and an empty area size in the group management table 45 (step 705).

As described above, the series of processes of the main flow 41*a* shown in FIG. 4 is consecutively executed and performance information is accumulated in the area file 42*a*.

Figure 13:
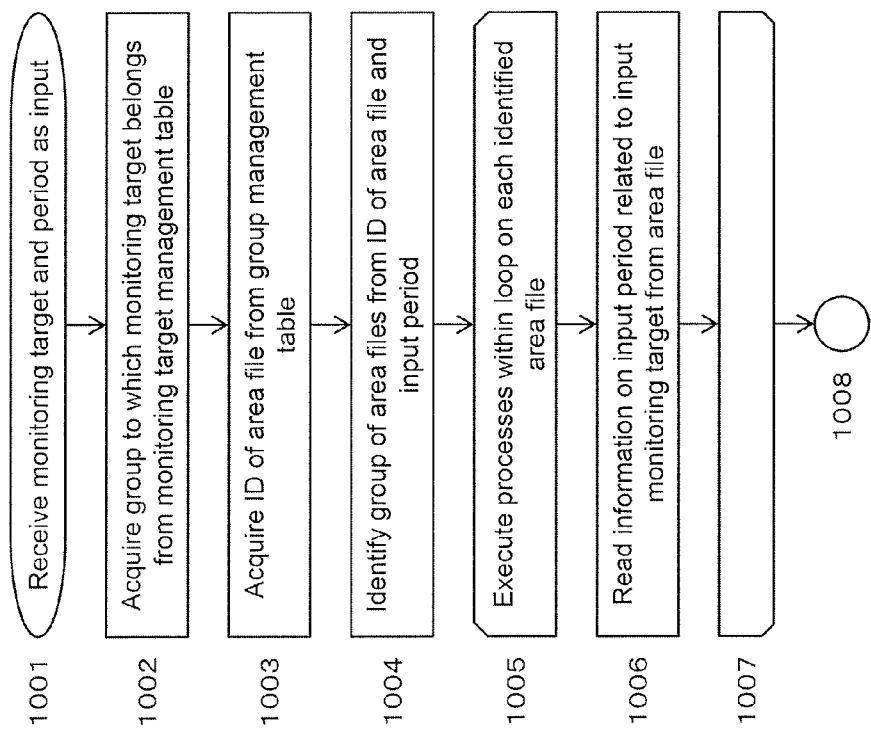
FIG. 13 is a flow chart of a performance information reading flow.

Next, a process of reading performance information accumulated in the area file 42*a* will be described. FIG. 13 is a flow chart showing the performance information reading flow 41*j*.

First, the CPU 20 receives information of a monitoring target of which performance information is to be read and a period as input (step 1001). The CPU 20 refers to the monitoring target management table 44 and acquires a group to which the received monitoring target belongs (step 1002), and further refers to the group management table 45 to acquire identification information of a group of area files 42*a* in which performance information of the group is recorded (step 1003). Identification information of a group of area files 42*a* is information identifying one or more area files 42*a* which records performance information of a monitoring target belonging to the group. In the present embodiment, individual area files 42*a* can be identified from the identification information and date information.

Based on the identification information of area files 42*a* and information of a date included in the period received in step 1001, the CPU 20 identifies the area file 42*a* to be read (step 1004). In the present embodiment, since a new area file 42*a* is created daily, the number of identified area files 42*a* differs depending on a specified period.

Next, the CPU 20 executes processes within a loop (steps 1005 to 1007) with respect to each of the identified area files 42*a*. In step 1006, the CPU 20 reads performance information of the period received in step 1001 with respect to the monitoring target received in step 1001 from the area files 42*a*.

In the example of the area file 42*a* shown in FIG. 18, pieces of performance information are consecutively recorded with one set constituted by Resource Name indicating which monitoring target the performance information corresponds to, time point information indicating which time point the performance information corresponds to, and a value of the performance information itself. The CPU 20 reads the value of performance information by using Resource Name to identify that the performance information corresponds to the monitoring target received in step 1001 and using time point information to identify that the performance information is included in the received period.

As described above, the present embodiment discloses a performance information management system which includes the storage apparatus 60 having a plurality of components as monitoring targets and the management computer 10 for managing the storage apparatus 60 and which manages performance information of the storage apparatus 60 with the management computer 10. The storage apparatus 60 is capable of acquiring performance information for each monitoring target. The management computer 10 allocates an initial storage area of which capacity differs for each monitoring target to each of the monitoring targets and stores performance information of a monitoring target in a storage area allocated to the monitoring target. In doing so, when detecting depletion of the storage area, the management computer 10 additionally allocates a consecutive storage area with a prescribed capacity to the monitoring target of which the storage area has been depleted and stores the performance information of the monitoring target in the additionally-allocated storage area. Since performance information is sequentially stored while additionally allocating a storage area with a prescribed capacity to a monitoring target, performance information of a same monitoring target can be stored in a consecutive storage area while reducing an effect caused by a process of securing a consecutive area in advance and time required to read performance information can be reduced.

In addition, the management computer 10 groups monitoring targets, allocates a storage area to each group, when attempting to store performance information of a monitoring target belonging to a group in a storage area allocated to the group, detects depletion of the storage area, additionally allocates a prescribed amount of consecutive storage area to the group of which the storage area has been depleted, and stores the performance information of the monitoring target in the additionally-allocated storage area. Accordingly, when writing performance information in a storage area, performance information of a plurality of monitoring targets belonging to a group can be stored in a storage area by a sequential access and a decline in performance can be suppressed not only during reading but also during writing.

Furthermore, a capacity of a storage area to be additionally allocated by the management computer 10 to each of a plurality of monitoring targets (or groups; hereinafter, the same logic applies) is a prescribed capacity (first capacity) or a capacity that is a multiple thereof. Since an initial storage area of which capacity differs for each monitoring target is allocated to each of the monitoring targets and, subsequently, a storage area with a certain capacity or a capacity that is a multiple thereof is additionally allocated, a state in which a storage area is allocated to each monitoring target at dispersed timings is maintained. For example, a capacity of a storage area to be additionally allocated to a group of monitoring targets is a multiple of the first capacity when multiplied by the number of monitoring targets. In this case, a multiple when multiplied by the number of monitoring targets need only be a numerical value that is close enough such that an operation for approximately equally dispersing timings at which storage areas are allocated is maintained and need not be a strict numerical value.

Furthermore, when a timing at which a storage area is additionally allocated to a monitoring target deviates for some reason, the management computer 10 can eliminate the deviation in the timing by changing an amount of the storage area to be allocated to the monitoring target. Although the timing at which a process of allocating a storage area to a monitoring target may deviate for some reason such as in a case where a failure to acquire performance information results in no performance information to be stored in a storage area and, consequently, a storage area is not used, the deviation in timing can be eliminated by adjusting an amount of a storage area to be allocated.

In addition, when attempting to store performance information in a storage area of a monitoring target, when a capacity of an unused storage area allocated to the monitoring target is less than a first threshold, the management computer 10 determines that the storage area has been depleted and a storage area is to be additionally allocated. Furthermore, when a period from a timing at which a storage area is additionally allocated due to depletion of a storage area to an originally-planned timing of additional allocation of a storage area to the monitoring target is equal to or larger than a second threshold, the management computer 10 additionally allocates a storage area with a capacity required until a next allocation timing of a storage area to the monitoring target. On the other hand, when the period is less than the second threshold, the management computer 10 additionally allocates a storage area required until an allocation timing following the next allocation timing of a storage area to the monitoring target. Accordingly, by additionally allocating a large storage area when an unused storage area is small, a frequency of occurrences of processes of adding a storage area can be reduced.

Furthermore, the management computer 10 determines a capacity of an initial storage area based on the number of monitoring targets so that timings at which storage areas are to be additionally allocated to monitoring targets are equally dispersed and, when the number of the monitoring targets changes, the management computer 10 changes a capacity of storage areas to be additionally allocated to monitoring targets based on the changed number of the monitoring targets so that timings at which storage areas are to be additionally allocated to monitoring targets are equally dispersed. Accordingly, even when the number of the monitoring targets changes due to a change in configuration of a storage apparatus or the like, timings at which storage areas are to be allocated to monitoring targets can be kept equally dispersed.

The embodiment described above merely represents an example for illustrating the present invention, and it is to be understood that the scope of the present invention is not limited to the embodiment. It will be obvious to those skilled in the art that the present invention can be implemented in various other modes without departing from the spirit of the present invention.

When a monitoring target is deleted and a capacity of an unused storage area allocated to the deleted monitoring target is equal to or larger than a prescribed capacity, the management computer 10 may reuse the unused storage area as a storage area to be additionally allocated to another monitoring target. By reusing a storage area allocated to a deleted monitoring target, utilization efficiency of a storage area can be increased and, by reusing a storage area on the condition that a size of the storage area is equal to or larger than a prescribed size, a frequency of random accesses can be suppressed.

REFERENCE SIGNS LIST

10 Management computer
20 CPU
40 Storage device
41 Management program
42 Performance information
42a Area file
43 Apparatus management table
44 Monitoring target management table
45 Group management table
46 Configuration information management table
50 Network
60 Storage apparatus
80 Resource
90 Resource list

The invention claimed is:

1. A performance information management system which comprises a target apparatus having a plurality of components as monitoring targets and a management computer for managing the target apparatus and which manages performance information of the target apparatus with the management computer, wherein the target apparatus is capable of acquiring performance information for each monitoring target, and the management computer is configured to:

allocate an initial storage area of which capacity differs for each monitoring target to each of the monitoring targets;

detect depletion of a storage area allocated to a monitoring target when attempting to store the performance information of the monitoring target to the storage area;

additionally allocate a consecutive storage area with a prescribed capacity to the monitoring target with the depleted storage area;

store the performance information of the monitoring target in the additionally-allocated storage area; wherein the capacity of the additionally-allocated storage area assigned to each of the plurality of monitoring targets, at equally dispersed timings, is a first capacity or a capacity that is a multiple thereof;

when a timing at which the additionally-allocated storage area is assigned to the monitoring target deviates from the equally dispersed timings for some reason, the management computer is configured to eliminate the deviation in the timing by changing an amount of the storage area to be allocated to the monitoring target;

attempts to store the performance information in the storage area of the monitoring target and when a capacity of an unused storage area allocated to the monitoring target is less than a first threshold, the management computer is configured to determine that the storage area has been depleted and stores performance information in the additionally-allocated storage area and a period from a timing at which the additionally-allocated storage area is assigned due to the depletion of the storage area to when an originally-planned timing of the additionally-allocated storage area assigned to the monitoring target is equal to or larger than a second threshold, the management computer is configured to assign the additionally-allocated storage area, such that the additionally-added storage area has a capacity required until a next allocation timing of a storage area to the monitoring target, but when the period is less than the second threshold, the management computer is configured to assign a second additionally-allocated storage area required until an allocation timing following the next allocation timing of the storage area to the monitoring target.

2. The performance information management system according to claim 1, wherein the management computer is configured to:

group the monitoring targets and allocate a storage area to each group;

when attempting to store performance information of a monitoring target belonging to the group in the storage area allocated to the group, detect depletion of the storage area;

additionally allocate a prescribed amount of consecutive storage area to the group of which the storage area has been depleted; and store the performance information of the monitoring target in the additionally-allocated storage area.

3. The performance information management system according to claim 1, wherein the management computer is configured to:

determine a capacity of the initial storage area based on the number of monitoring targets so that timings at which the additionally-allocated storage areas assigned to monitoring targets are equally dispersed; and when the number of the monitoring targets changes, the management computer is configured to change the capacity of the additionally-allocated storage areas assigned to the monitoring targets based on the changed number of the monitoring targets so that timings at which the additionally-allocated storage areas assigned to monitoring targets are equally dispersed.

4. The performance information management system according to claim 1, wherein when a monitoring target is deleted and a capacity of an unused storage area allocated to the deleted monitoring target is equal to or larger than a prescribed capacity, the management computer is configured to reuse the unused storage area as the additionally-allocated storage area to be assigned to another monitoring target.

5. A management computer that manages performance information of a target apparatus which has a plurality of components as monitoring targets and which is capable of acquiring the performance information for each of the monitoring targets, the management computer comprising:

a storage device configured to store management information and a management program;

a CPU configured to refer to the management information on the storage device; and a communication interface configured to communicate with the target apparatus, wherein the CPU is configured to:

allocate an initial storage area of which capacity differs for each monitoring target to each of the monitoring targets on the storage device;

detect depletion of a storage area allocated to a monitoring target when attempting to store the performance information of the monitoring target acquired from the target apparatus via the communication interface to the storage area;

additionally allocate a consecutive storage area with a prescribed capacity to the monitoring target with the depleted storage area;

store the performance information of the monitoring target in the additionally-allocated storage area; wherein the capacity of the additionally-allocated storage area assigned to each of the plurality of monitoring targets, at equally dispersed timings, is a first capacity or a capacity that is a multiple thereof;

when a timing at which the additionally-allocated storage area is assigned to the monitoring target deviates from the equally dispersed timings for some reason, the management computer is configured to eliminate the deviation in the timing by changing an amount of the storage area to be allocated to the monitoring target;

attempts to store the performance information in the storage area of the monitoring target and when a capacity of an unused storage area allocated to the monitoring target is less than a first threshold, the management computer is configured to determine that the storage area has been depleted and stores performance information in the additionally-allocated storage area and a period from a timing at which the additionally-allocated storage area is assigned due to the depletion of the storage area to when an originally-planned timing of the additionally-allocated storage area assigned to the monitoring target is equal to or larger than a second threshold, the management computer is configured to assign the additionally-allocated storage area, such that the additionally-added storage area has a capacity required until a next allocation timing of a storage area to the monitoring target, but when the period is less than the second threshold, the management computer is configured to assign a second additionally-allocated storage area required until an allocation timing following the next allocation timing of the storage area to the monitoring target.

6. The management computer according to claim 5, wherein the CPU is configured to:

group the monitoring targets and allocate a storage area to each group;

when attempting to store performance information of a monitoring target belonging to the group in the storage area allocated to the group, detect depletion of the storage area;

additionally allocate a prescribed amount of consecutive storage area to the group of which the storage area has been depleted; and store the performance information of the monitoring target in the additionally-allocated storage area.

7. The management computer according to claim 5, wherein the capacity of the storage area to be additionally allocated to each of the plurality of monitoring targets is a first capacity or a capacity that is a multiple thereof.

8. A performance information management method for, in a performance information management system including a target apparatus which has a plurality of components as monitoring targets and which is capable of acquiring performance information of each monitoring target and also including a management computer for managing the target apparatus, managing the performance information of the target apparatus with the management computer, wherein the management computer:

allocates an initial storage area of which capacity differs for each monitoring target to each of the monitoring targets;

detects depletion of a storage area allocated to a monitoring target when attempting to store the performance information of the monitoring target to the storage area;

additionally allocates a consecutive storage area with a prescribed capacity to the monitoring target with the depleted storage area;

stores the performance information of the monitoring target in the additionally-allocated storage area; wherein the capacity of the additionally-allocated storage area assigned to each of the plurality of monitoring targets, at equally dispersed timings, is a first capacity or a capacity that is a multiple thereof;

when a timing at which the additionally-allocated storage area is assigned to the monitoring target deviates from the equally dispersed timings for some reason, the management computer is configured to eliminate the deviation in the timing by changing an amount of the storage area to be allocated to the monitoring target;

attempts to store the performance information in the storage area of the monitoring target and when a capacity of an unused storage area allocated to the monitoring target is less than a first threshold, the management computer is configured to determine that the storage area has been depleted and stores performance information in the additionally-allocated storage area and a period from a timing at which the additionally-allocated storage area is assigned due to the depletion of the storage area to when an originally-planned timing of the additionally-allocated storage area assigned to the monitoring target is equal to or larger than a second threshold, the management computer is configured to assign the additionally-allocated storage area, such that the additionally-added storage area has a capacity required until a next allocation timing of a storage area to the monitoring target, but when the period is less than the second threshold, the management computer is configured to assign a second additionally-allocated storage area required until an allocation timing following the next allocation timing of the storage area to the monitoring target.

9. The performance information management method according to claim 8, wherein the management computer:

groups the monitoring targets and allocates a storage area to each group;

when attempting to store performance information of a monitoring target belonging to the group in the storage area allocated to the group, detects depletion of the storage area;

additionally allocates a prescribed amount of consecutive storage area to the group of which the storage area has been depleted; and stores the performance information of the monitoring target in the additionally-allocated storage area.

10. The performance information management method according to claim 8, wherein the capacity of the storage area to be additionally allocated to each of the plurality of monitoring targets is a first capacity or a capacity that is a multiple thereof.

* * * * *